US005287007A

United States Patent [19]

Rodi et al.

[11] Patent Number: 5,287,007

[45] Date of Patent: Feb. 15, 1994

[54] DEVICE FOR COUPLING ADDITIONAL EQUIPMENT TO A MACHINE

[75] Inventors: Anton Rodi; Udo Blasius, both of Leimen; Jürgen Reithofer, Nussloch; Michael Lehnert; Werner Stadler, both of Heidelberg, all of Fed. Rep. of Germany

[73] Assignee: Heidelberger Druckmaschinen AG, Heidelberg, Fed. Rep. of Germany

[21] Appl. No.: 456,363

[22] Filed: Dec. 26, 1989

[30] Foreign Application Priority Data

Dec. 24, 1988 [DE] Fed. Rep. of Germany ....... 3843966

[51] Int. Cl.[5] .............................................. H02J 3/00

[52] U.S. Cl. ........................................ 307/38; 307/11

[58] Field of Search .................... 250/551; 307/11, 31, 307/38, 42, 112, 113, 115, 125, 139, 140, 141.4

[56] References Cited

U.S. PATENT DOCUMENTS

| | | | |
|---|---|---|---|
| 3,678,291 | 7/1972 | Coe | 250/551 |
| 3,970,784 | 7/1976 | Meijerint | 250/551 |
| 4,283,636 | 8/1981 | Tchang | 307/38 |
| 4,694,421 | 9/1987 | Ogawa | 307/31 |
| 4,889,999 | 12/1989 | Rowen | 307/115 |

FOREIGN PATENT DOCUMENTS

| | | |
|---|---|---|
| 2822938 | 11/1979 | Fed. Rep. of Germany . |
| 3600887 | 10/1986 | Fed. Rep. of Germany . |
| 3615463 | 11/1987 | Fed. Rep. of Germany . |
| 3708925 | 11/1987 | Fed. Rep. of Germany . |
| 3813590 | 11/1988 | Fed. Rep. of Germany . |
| 3814831 | 10/1989 | Fed. Rep. of Germany . |
| 61-84251 | 4/1986 | Japan . |
| 2189745 | 11/1987 | United Kingdom . |

OTHER PUBLICATIONS

"Relays: Solid State I/O Converter Modules Feature Optically Isolated Input", Tony Bishop, Canadian Electronics Engineering, May 1976, pp. 30–31.

*Primary Examiner*—Jeffrey A. Gaffin

[57] ABSTRACT

A device for coupling additional equipment to a machine having a control system with inputs and outputs for controlling the machine. The device includes connecting lines connecting the control system and the additional equipment, with the connecting lines coming together at a central connection site. The device can be located at the central connection site for metallically isolating all of the inputs and outputs of the control system from all of the inputs and outputs of the additional equipment.

10 Claims, 3 Drawing Sheets

DEVICE FOR COUPLING ADDITIONAL EQUIPMENT TO A MACHINE

The invention relates to a device for coupling additional equipment to a machine and, more particularly, to a machine having a control system for controlling the machine.

It is of general knowledge that when an auxiliary apparatus or equipment is being added to a machine, such as a printing machine, for example, it is connected to the control device or system of the machine. For this purpose, the connection cables of the auxiliary apparatus or equipment are inserted into the control cabinet of the machine containing the control device and therein suitably wired to the control device. If the machine, such as a printing machine, has a decentralized control system, it is necessary to connect the auxiliary apparatus or equipment to each of the respective control devices of which the decentralized system is formed. In most cases, such auxiliary apparatus or equipment is added only after the printing machine, for example, has been installed, so that a subsequent intervention into the control system of the machine is necessary. Under certain circumstances, several additional apparatuses are added after successive time intervals. Each addition of the auxiliary apparatuses or equipment necessitates a separate intervention into the control system of the machine. Such interventions into the control system may cause faulty wiring, however, and subsequent laying of cables, terminal connector strips and the like may, moreover, affect the entire electronic set-up of the control system. Furthermore, when such additional equipment is being coupled to the machine, it is necessary to know the set-up and function of the entire control system in order to be able to connect the additional equipment at the respective or suitable location. Under certain circumstances, a modification of the control program may be necessary.

It is accordingly an object of the invention to provide a device for coupling additional equipment to a machine wherein the connection of the additional equipment to the machine is considerably simplified, is safer, and avoids both any intervention into the control system and any modification of the set-up and/or functioning of the entire control system.

With the foregoing and other objects in view, there is provided, in accordance with the invention, a device for coupling additional equipment to a machine having a control system with inputs and outputs for controlling the machine, comprising connecting lines mutually connecting the control system and the additional equipment, the connecting lines coming together at a central connection site, and means located at the central connection site for providing metallic isolation for all of the inputs and outputs of the additional equipment.

In accordance with other features of the invention, the machine is a printing machine, and the additional equipment includes at least one apparatus auxiliary to the printing machine.

In accordance with a further feature of the invention, the machine is a printing machine, and the additional equipment includes devices for pretreating and further processing a printing product.

In accordance with more detailed features of the invention, the connecting lines are data lines and/or signal lines.

The capability of mutually coupling the additional equipment and the control system in a simple manner and without any problems constitutes a marked advantage of a central connection site for electric lines extending from the control system to the additional equipment. This coupling can be effected relatively rapidly and without knowing the set-up or construction of the printing machine control system.

In accordance with additional features of the invention, the central connection site is located outside the switch or control cabinet containing the control device so that it is unnecessary to open the switch or control cabinet to which the additional equipment is connected. The possibility also exists, however, of accommodating the connecting site in a part of the switch or control cabinet which is separated from the electronic component of the control device or system so that, in this case, as well, intervention into the electronic control system is avoided when connecting the additional equipment.

For electrically and electronically protecting the control system of the machine with respect to the additional apparatus or equipment, in accordance with other features of the invention, the means for providing metallic isolation the inputs and outputs comprise optocouplers or relays. The coupling of the additional equipment is thereby performed at zero potential and is nonreactive. In view of the multiplicity of types of additional or auxiliary equipment of which some operate at different voltages, the potential separation within the connection site constitutes a markedly beneficial simplification. The assembly of all of the components for galvanic isolation in the central connection site contributes also to facilitating and simplifying the formation of the connection of the additional equipment to the machine.

With many additional and auxiliary devices, it is necessary to transmit a clock signal from the machine to those devices in order to effect in-phase control of the respective additional auxiliary equipment with respect to the machine clock. In accordance with yet another feature of the invention, therefore, means are provided for transmitting a clock signal from the machine via the central connection site to the additional and auxiliary equipment.

The clock signal of the machine is generated, for example, by a clock generator or by a switch which is controlled by a camshaft of the machine e.g. a printing machine, and connected or looped into the connection site via suitable lines. This signal, as well, is metallically isolated in the central connection site and can be made available to the additional equipment at zero potential.

In accordance with a concomitant feature of the invention, a switch is provided on the additional equipment for stopping the printing machine from operating, and connecting lines are also provided for connecting the switch to the central connection site. This switch may be constructed as an emergency cut-off switch, for example. The emergency cut-off signal is thus also transmitted via the central connection site, whereat potential separation is effected. The generated emergency cut-off signal thus effects the fastest possible shutdown of the printing machine through the control system.

Other features which are considered as characteristic for the invention are set forth in the appended claims.

Although the invention is illustrated and described herein as embodied in a device for coupling additional equipment to a machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
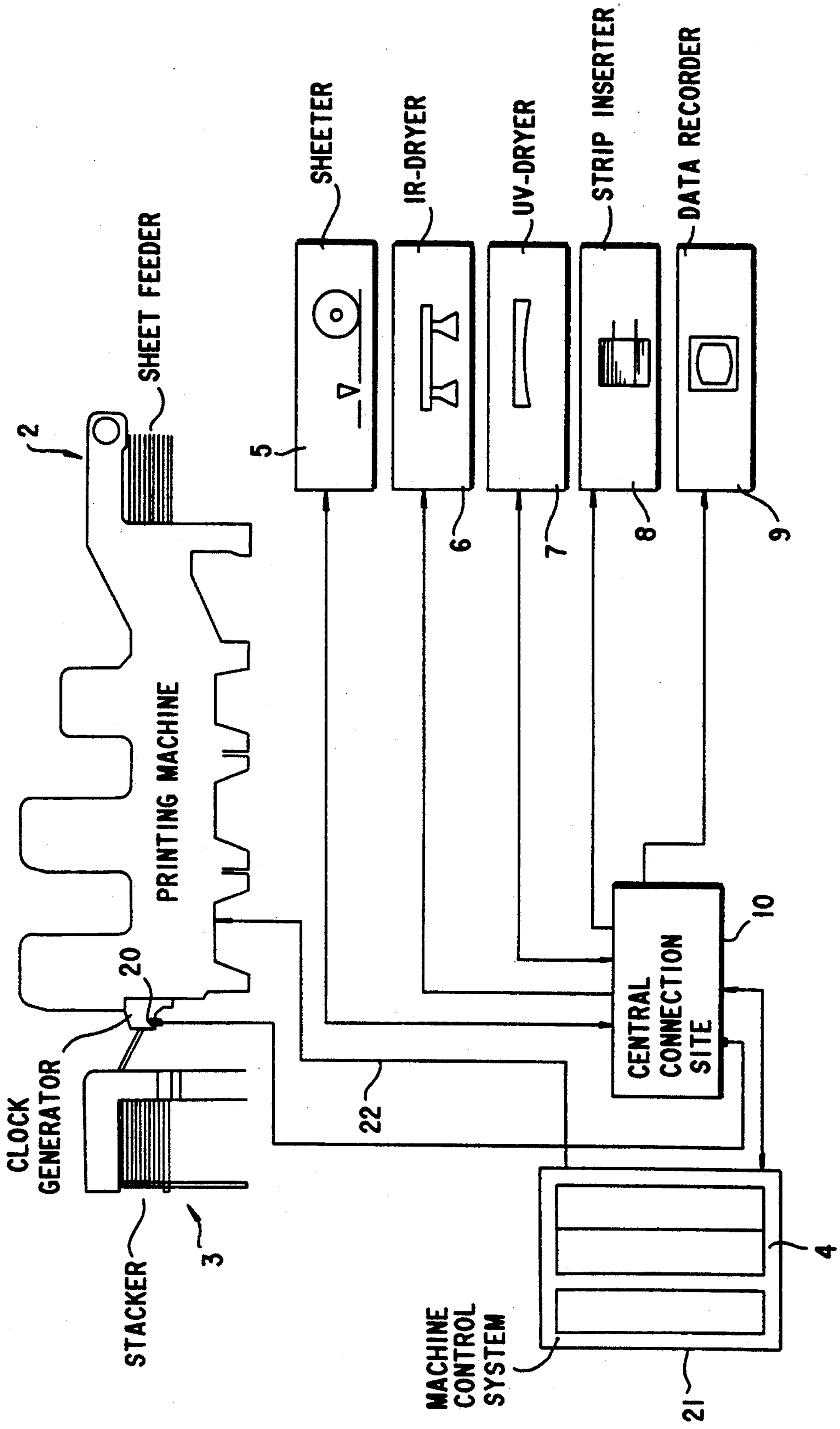
FIG. 1 is a diagrammatic view of the coupling device according to the invention mutually connecting a machine, namely a printing machine, and various devices or apparatuses constituting additional and auxiliary equipment.

Referring now to the drawing and, first, particularly to FIG. 1 thereof, there is shown therein, diagrammatically, a machine, namely a printing machine 1, formed, for example, of several printing units, a sheet feeder 2 and a sheet delivery 3. The machine is controlled by a control device or system 4 which is connected via data and signal lines 22 with electric and electronic components, respectively, of the machine. A printing machine having such a control device has become known heretofore from German Published Non-Prosecuted Application (DE-OS) 37 08 925.

A printing machine often has a plurality of additional devices or apparatuses which are added to the machine either during or after assembly of the machine. Such additional or auxiliary equipment includes, for example, a sheeter 5 for cutting a paper roll into sheets, an infrared (IR) dryer 6, an ultraviolet (UV) dryer 7, a strip inserter 8 or a production data recorder 9, and so forth. There are, of course, many more auxiliary devices which have not been mentioned amongst the foregoing. Each of the additional and auxiliary devices 5 to 9 is to be controllable by the control system or device 4 of the printing machine 1. It should furthermore be possible for the control system 4 to process and display signals generated by those additional and auxiliary devices 5 to 9, such as signals which indicate malfunctions or the mode of operation of the respective additional or auxiliary device. A central connection site 10 is consequently provided between the control system or device 4 and the additional equipment 5 to 9. All of the lines between the control system 4 and the additional equipment 5 to 9 come together or assemble in this central connection site 10. Furthermore, the central connection site or adapter 10 has a machine clock signal applied thereto which is necessary, for example, for controlling different additional devices 5 to 9. This machine clock signal is generated by a clock generator 20 located on the machine 1. Of course, the machine clock signal may also be generated by the control system 4 for the purpose of effecting control of the machine 1.

Assembling additional equipment with or on the printing machine 1 does not require any intervention into the control system or device 4 i.e. does not require that any wiring be performed in the control device 4. All of the data lines and signal lines for the additional equipment 5 to 9 can be connected to the central connection site 10. Interventions and consequent possible faulty wiring in the control device 4 can thereby be avoided. The central connection site 10 can be located outside the housing of the control system or device 4, so that when additional equipment is connected, the control device 4 need not be opened any more. The central connection site 10 is advantageously disposed in a small housing which is fastened to the outer wall 21 of the switch or control cabinet containing the control system or device 4. The central connection site 10 is mainly formed of one or both of the two elements which are illustrated in FIGS. 2 and 3.

Figure 2:
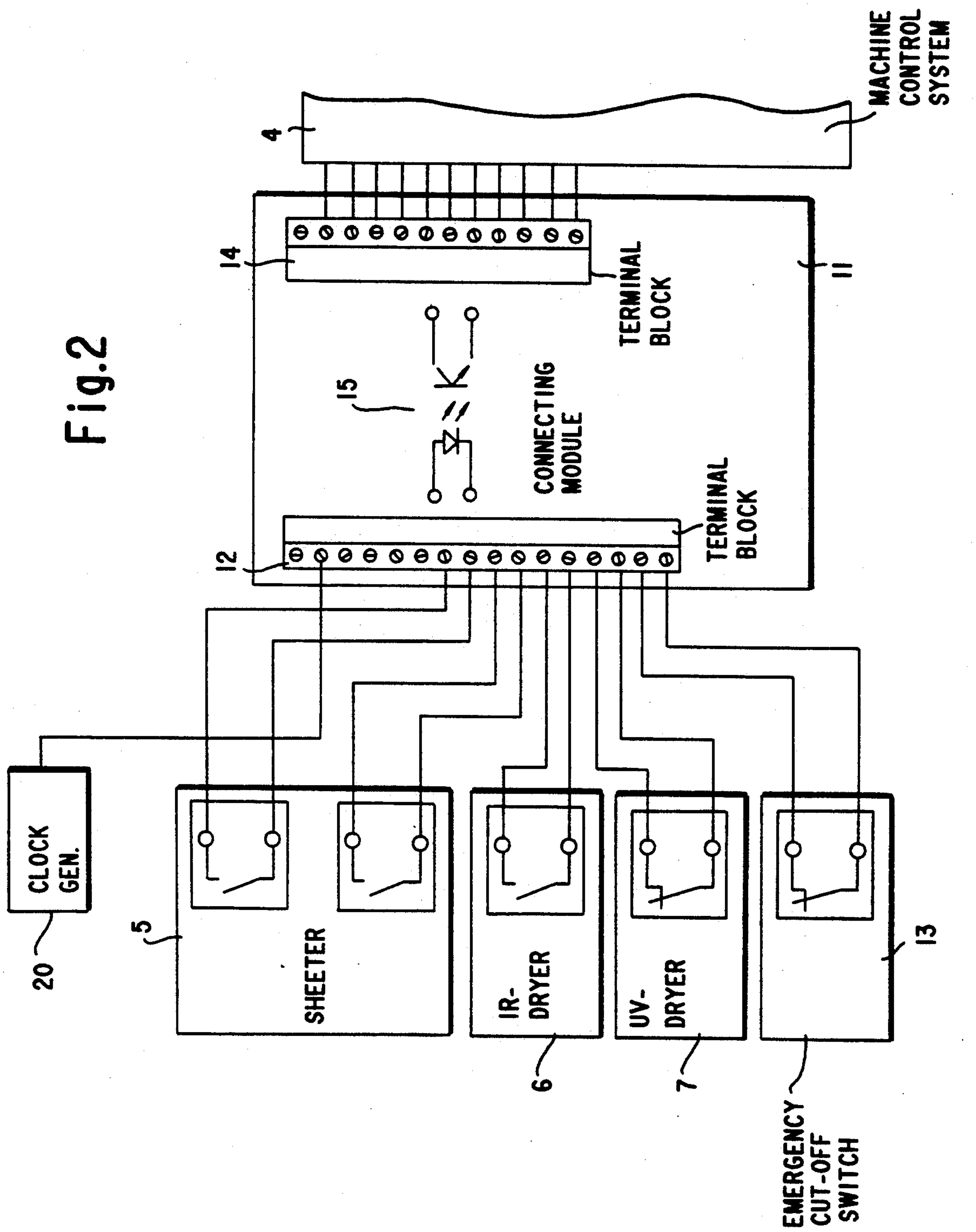
FIG. 2 is a more detailed diagrammatic view of the coupling device according to the invention, showing a connection module for transmitting signals to the control system of the machine.

FIG. 2 shows a connection module 11 for transmitting signals generated by additional equipment to the control system or device 4. All of the signal lines of the additional devices 5, 6 and 7 are connected to a terminal block or strip 12. Although not shown on the sheeter 5, the latter is provided with an emergency stop or cut-off switch 13 having connecting lines passing through the connection module 11. Another terminal block or strip 14 on the connection module is appropriately connected to the machine 4. Optocouplers shown symbolically at 15 are provided in the connection module 11 between the terminal strips 12 and 14 for effecting a mutual metallic isolation of the additional equipment and the control device 4. In this regard, it is noted that respective individual optocouplers are assigned to each pair of connection lines.

Figure 3:
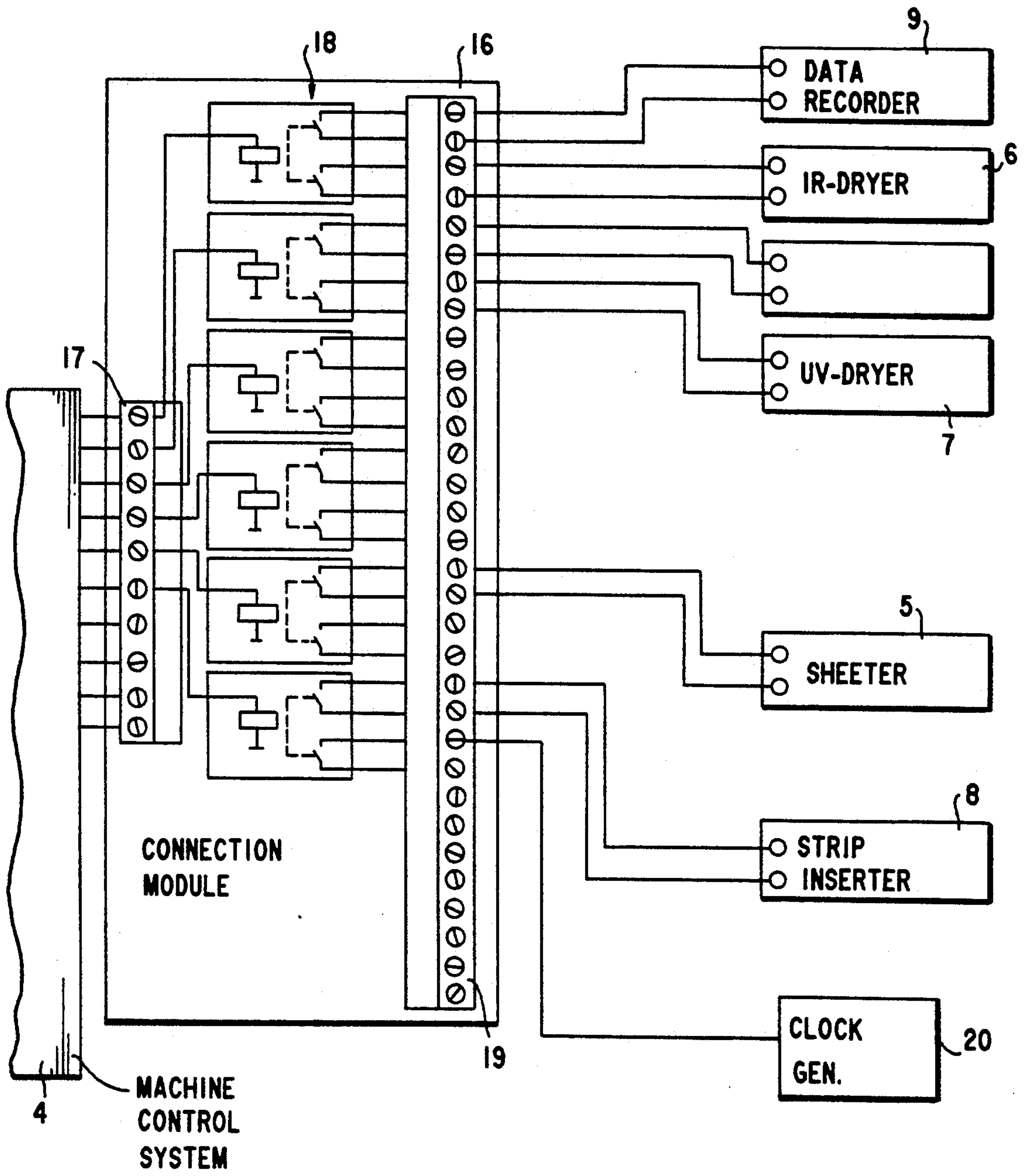
FIG. 3 is a view similar to that of FIG. 2 of another connection module of the coupling device according to the invention, for transmitting output signals from the control device of the machine.

FIG. 3 represents another connection module 16, mounted in the central connection site 10 and serving to transmit output signals generated by the control system or device 4 to the additional equipment. The connection module 16 has a terminal block or strip 17 to which the signal lines from the control device 4 of the machine 1 are connected.

The signals which are transmitted via the terminal strip 17 are fed to relays 18 having outputs which are, in turn, fed via another terminal block or strip 19 to the additional equipment 5 to 9. In this regard, therefore, there is also provided a metallic isolation between the additional equipment 5 to 9 and the control system 4 with respect to the control signals for the additional equipment 5 to 9, so as to prevent a feedback of the electric signals from the additional equipment 5 to 9 to the control system 4. By means of the central connection site 10, all of the connecting lines between the control system or device 4 and the additional equipment 5 to 9 are thus metallically isolated, and the electronic control system 4 is protected. Naturally, it is also possible to introduce other elements for effecting a metallic isolation, instead of optocouplers or relays, or to use the optocouplers and relays alternatively depending upon the respective additional devices 5 to 9. For example, optocouplers may be used for the output signals of the control system or device 4, just as well as it is possible to use relays for the input signals to the control system or device 4.

We claim:

1. A printing machine complex comprising a printing machine, at least one auxiliary device to the printing machine, a control system for controlling said printing machine and said auxiliary device, a central connection site for interconnecting said printing machine, said auxiliary device, and said control system; and metallic isolating means in said central connection site for metallically isolating said auxiliary device, said printing machine, and said control system from each other.

2. A printing machine complex according to claim 1, wherein said central connection site is received in a closed housing.

3. A printing machine complex according to claim 1, wherein the printing machine has a switch cabinet having an outer wall, and said central connection site is in said outer wall.

4. A printing machine complex according to claim 1, in which said metallic isolating means comprise optocouplers.

5. A printing machine complex according to claim 1, wherein said metallic isolating means comprise relays.

6. A printing machine complex according to claim 1, including means for transmitting a clock signal from the printing machine via said central connection site to the auxiliary device.

7. A printing machine complex according to claim 1, wherein the auxiliary device has a switch for stopping the printing machine from operating, and including lines for connecting said switch via said central connection site to the printing machine.

8. A printing machine complex according to claim 1, wherein the auxiliary device includes at least one apparatus auxiliary to the printing machine.

9. A printing machine complex according to claim 1, wherein the auxiliary device includes devices for pretreating and further processing a printing product.

10. A printing machine complex according to claim 1, including connecting lines interconnecting said printing machine, said central connecting site and said auxiliary device, said interconnecting lines serving for transmitting data and/or signals.

* * * * *